Sept. 9, 1969 R. W. BACHI 3,465,608
GEAR TRAIN WITH DISMOUNTABLE RATIO-DETERMINING GEAR ASSEMBLY
Filed Oct. 2, 1967 3 Sheets-Sheet 1

Inventor
Robert W. Bachi

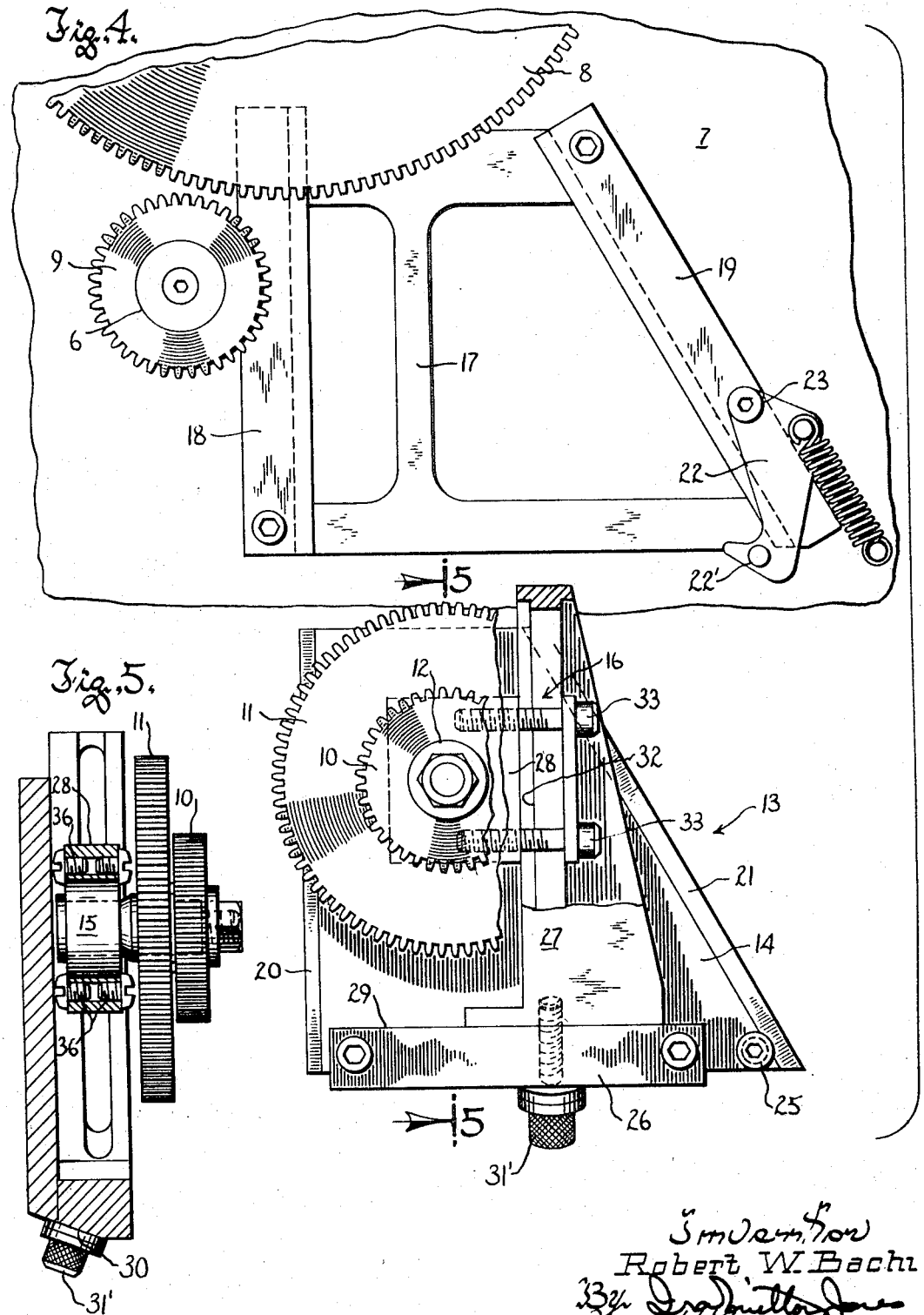

United States Patent Office 3,465,608
Patented Sept. 9, 1969

3,465,608
GEAR TRAIN WITH DISMOUNTABLE RATIO-
DETERMINING GEAR ASSEMBLY
Robert W. Bachi, Itasca, Ill., assignor to Bachi, Inc.,
Wood Dale, Ill., a corporation of Illinois
Filed Oct. 2, 1967, Ser. No. 672,199
Int. Cl. F16h 3/20
U.S. Cl. 74—325                                6 Claims

ABSTRACT OF THE DISCLOSURE

Two adjacent but non-meshing gears of a gear train are drivingly connected by intermediate gearing mounted on a carrier that can slide to an inoperative position at which it can be dismounted and replaced by an identical carrier with different intermediate gearing thereon. Convergent side edge portions on the carrier are engageable with rails that guide the carrier to and define an accurately predetermined operative position of the carrier. The rails cooperate with a releasable latch to hold the carrier against displacement from its operative position. A bearing for the intermediate gearing is adjustable to any desired location on the carrier.

---

This invention relates to gear trains, and more particularly to gear trains in which a selected one of a plurality of interchangeable differently preset gear assemblies or units drivingly connects a pair of non-meshing gears, and by which the driving ratio between these gears can be quickly changed by simply replacing one such assembly or unit with another.

Although the concept underlying this invention is not new, the expedients heretofore available for its implementation, lacked the desired simplicity and practicability. The Beck et al. Patent No. 2,792,713, issued May 21, 1957 is an example of the prior gear trains which were equipped with dismountable and replaceable change-gear assemblies. These prior attempts to utilize the interchangeable ratio-determining gear assembly concept fell short of their objective for one reason or another, often because the replacement was a major undertaking requiring the use of tools and a considerable amount of time.

Accordingly it is the purpose and object of this invention to provide a gear train by which two non-meshing gears can be drivingly connected in any one of a wide variety of ratios by the simple operation of releasing a spring latch, withdrawing a cartridge-like unit and replacing it with another similar unit but having a set of different ratio gears thereon. This requires but a few seconds.

It is also an object of this invention to provide a cartridge-like gear change unit in which the gearing is mounted on adjustable bearing means, so that a wide variety of ratios between the gears that are drivingly connected by the interchangeable units can be obtained with relatively few such units.

With these observations and objects in mind, the manner in which the invention achieves its purpose will be appreciated from the following description and the accompanying drawings. This disclosure is intended merely to exemplify the invention. The invention is not limited to the particular structure disclosed, and changes can be made therein which lie within the scope of the appended claims without departing from the invention.

The drawings illustrate one complete example of the physical embodiment of the invention constructed according to the best mode so far devised for the physical application of the principles thereof and in which.

Figure 1:
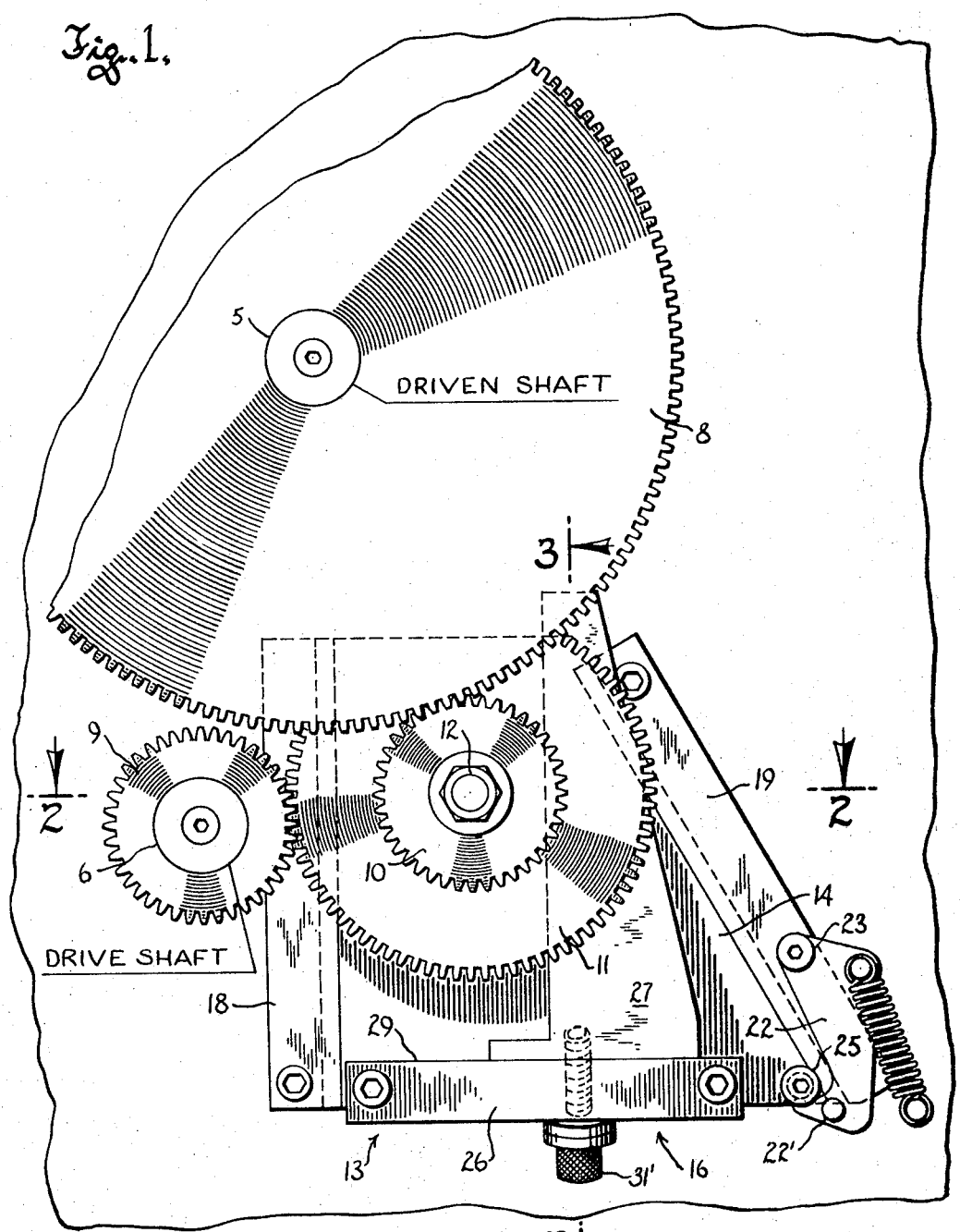
FIGURE 1 is a top view of a gear train embodying this invention.
Figure 2:
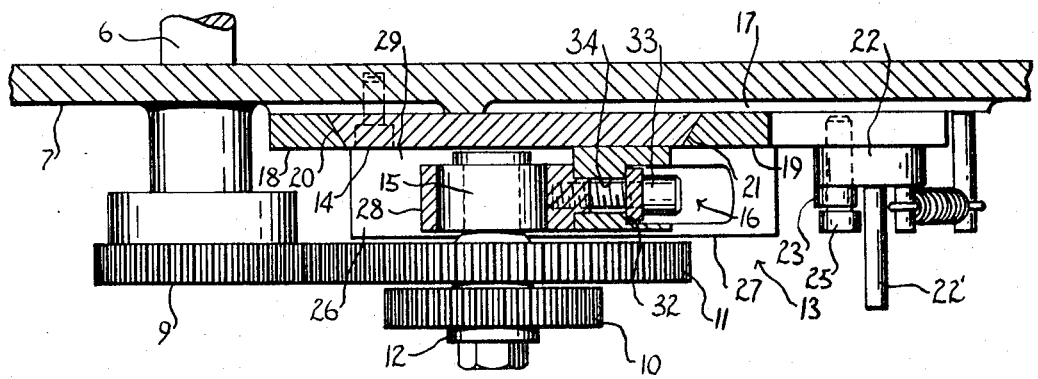
FIGURE 2 is a cross sectional view through FIGURE 1 on the plane of the line 2—2.
Figure 3:
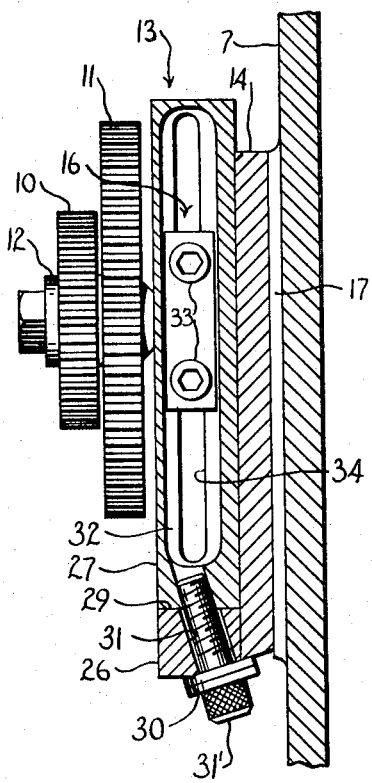
FIGURE 3 is a sectional view through FIGURE 1 on the plane of the line 3—3.

FIGURE 4 like FIGURE 1 is a top view of the gear train, but with the dismountable or removable cartridge-like intermediate gearing assembly or unit withdrawn from its operative position; and FIGURE 5 is a sectional view through FIGURE 4 on the plane of the line 5—5.

Referring now to the accompanying drawings, the numerals 5 and 6 designate a pair of rotatable shafts that are to be drivingly connected in any one of a number of different ratios. As indicated one of these shafts is a drive shaft and the other is driven. There are of course many instances in which it is necessary to change the driving ratio between a pair of shafts, and also to do so quickly; hence the shafts 5 and 6 should be considered part of any machine in which this need exists.

The shafts 5 and 6 are constrained to rotate on parallel axes by means of bearings (not shown) that may be mounted in or at least are fixed with respect to a supporting wall 7 with their axes perpendicular to said wall. The wall 7 is part of the machine that includes the shafts.

Fixed to the shafts 5 and 6 are gears 8 and 9 respectively. These gears are not in mesh, being spaced from one another both axially and radially. They are drivingly connected by intermediate gearing comprising a pair of gears 10 and 11 fixed to a common shaft 12. The gears 10 and 11 form part of a cartridge-like gear change unit or assembly designated generally by the numeral 13, and hereinafter—for brevity—simply called a "cartridge."

The diameters of the gears 10 and 11 determine the ratio at which the shafts 5 and 6 turn; hence by withdrawing the cartridge 13 and substituting another similar cartridge in which the gears 10 and 11 are of different size, the driving ratio between the shafts 5 and 6 can be quickly changed.

The cartridge 13 comprises a carrier consisting of a flat base 14, a bearing 15 in which the shaft 12 is journalled, and structure indicated generally by the numeral 16, by which the bearing is adjustably mounted on the base. The base is slidably seated upon the wall 7 so that the cartridge may be slid inwardly to an accurately defined operative position, shown in FIGURE 1, at which gears 10 and 11 are in proper meshing engagement with the gears 8 and 9, and outwardly to a dismounting position.

The base of the cartridge has flat parallel top and bottom surfaces, and the portion of the wall 7 on which the base is seated preferably has a raised pad 17, the top surface of which is accurately machined to lie in a plane exactly perpendicular to the axes of the shafts 5 and 6, and to firmly but freely slidably support the base of the cartridge.

Inward sliding movement of the cartridge to its defined operative position is guided by a pair of rails 18 and 19 that are fixed to the wall 7 in spaced apart inwardly converging relation. These rails are engaged by correspondingly convergent side edges 20 and 21, respectively, of the base 14 as the cartridge is slid inwardly between the rails towards its defined operative position. The spacing of the rails 18 and 19 and the angle defined by their inner edges is very accurately established in the securement of the rails to the wall 7, and is such that when the inward movement of the cartridge is arrested by the wedging of its base 14 between the rails, the cartridge will be in its operative position.

The cartridge is releasably held in its operative position by a spring biased latch 22 which is pivoted, as at 23, to the rail 19 and snaps over a keeper 25 when the cartridge reaches its defined operative position. The keeper is simply a stud threaded into the base, and a pin 22′ fixed to and projecting upwardly from the latch provides a handle by which the latch may be disengaged from the keeper to permit the cartridge to be slid outwardly away from its operative position.

Attention is directed to the fact that the inner edges of the rails 18 and 19 are bevelled and form ledges under which the edges 20 and 21 of the cartridge base—which are matingly bevelled—are confined when the cartridge is in its operative position. Hence the interengaging edges of the rails and the cartridge not only define the operative position of the cartridge, but also hold the cartridge down on the wall 7.

It should be noted that the angular disposition of the rails 18 and 19 is such, with respect to the gears 8 and 9, that during final inward movement of the cartridge to its operative position, its gear 10 and 11 are properly guided into mesh with the gears 8 and 9.

Since in the operative position of the cartridge and any of its counterparts the cartridge base always occupies exactly the same position with respect to the gears 8 and 9—which of course rotate on fixed axes—it is obvious that the location of the gears 10 and 11 on the cartridge base must be adjustable in order for different ratio intermediate gearing to be used. This necessary adjustability is obtained by the structure hereinbefore generally identified by the numeral 16.

The structure 16 comprises a rail 26 fixed to the cartridge base along the edge thereof which is outermost when the cartridge is in position, a bracket 27 slidably seated on the rail 26, and a bearing block 28 adjustably secured to the bracket and having the bearing 15 mounted therein. The rail 26 has an accurately flat inner surface 29 which is perpendicular to the flat top surface of the base 14 and a flat outer surface portion 30 which lies in a plane that forms an acute angle to the plane of the surface 29 and is flush with the adjacent edge of the base.

A slot 31 extending lengthwise of the rail with its sides normal to the inclined surface portion 30, receives a screw 31' which is threaded into the base of the bracket 27. Tightening of this screw secures the bracket in any position along the length of the rail 26 to which it may be slid, and because of the angular disposition of the screw, the tightening thereof also pulls the bracket tightly against the top surface of the cartridge base.

The bracket 27 is formed with a track 32 which is perpendicular to the rail 26 and on which the bearing 28 is slidably seated. Clamping screws 33 extending through a slot 34 in the bracket and opening to its track are threaded into the bearing block and, when tightened, secure the block to the track 32 in any position along the length thereof.

It follows, therefore, that by adjustment of the bracket 27 along the rail 26 and adjustment of the bearing block along the track 32, the axis of the intermediate gears 10 and 11 can be brought to any point on the cartridge base needed to enable the gears 10 and 11 to properly mesh with the gears 8 and 9, regardless of the sizes of the former, within the capacity of the device.

The adjustments to accommodate intermediate gears 10 and 11 of any particular size are not made with the cartridge in place, but rather in the tool room where a suitable fixture (not shown) can be provided. In this manner, therefore, a number of interchangeable cartridges, each with different pre-set intermediate gearing, can be provided.

Of course, where warranted, the different cartridges could have the bearing of their respective intermediate gears mounted in a fixed position on the cartridge base, but for the sake of flexibility it is preferable that the location of the bearing block 28 be adjustable.

Substitution of one set of gears 10–11 for another is facilitated by the manner in which the bearing 15 is mounted in the block 16. As seen in FIGURE 5, the bearing is quickly removably held in the block by screws 36 threaded into the block from opposite sides thereof with their heads overlying the outer race of the bearing. Thus upon detachment of the bearing block from the bracket 27, the bearing 15, with the gears supported thereby, can be easily removed and replaced with another like bearing having a different set of gears journalled therein.

From the foregoing description taken with the accompanying drawings, it will be apparent to those skilled in the art that this invention provides a very practicable way of changing the driving ratio of a gear train, and that the invention is especially useful in machines in which the driving ratio between two shafts must be quickly and frequently changed, since no tools are required to substitute one intermediate gearing cartridge for another.

What is claimed as my invention is:

1. A gear train comprising two adjacent non-meshing gears which are constrained to rotate on parallel axes fixed with respect to a supporting wall therefor, and intermediate gearing to drivingly connect said gears, characterized by the following:
   (A) a dismountable carrier upon which the intermediate gearing is rotatably mounted and with which said gearing is bodily movable;
   (B) means on said wall providing a supporting surface parallel with said wall on which the carrier rides as it is slid inwardly toward and outwardly from a defined operative position at which the intermediate gearing thereon is in meshing engagement with both of said gears;
   (C) a pair of converging guide rails on the supporting wall to receive the carrier therebetween during inward sliding movement thereof toward said defined operative position for guiding it to and defining said position; and
   (D) cooperating automatically engageable means on said wall and on the carrier for releasably holding the carrier against displacement out of its defined operative position.

2. The gear train of claim 1, wherein said cooperating automatically engageable means comprises a spring loaded latch and a keeper therefor, which automatically engage when the carrier reaches its operative position.

3. The gear train of claim 1, wherein said guide rails define ledges which overlie the supporting surface on which the carrier is slid,
   and wherein said portion of the carrier that travels between the tracks has opposite edges to engage under said ledges when the carrier is in its operative position.

4. A gear train comprising two adjacent non-meshing gears which are constrained to rotate on parallel axes fixed with respect to a supporting wall therefor, and intermediate gearing to drivingly connect said gears, characterized by the following:
   (A) a dismountable carrier upon which the intermediate gearing is rotatably mounted and with which said gearing is bodily movable;
   (B) means on said wall providing a supporting surface for the carrier on which it can be slid inwardly toward and outwardly from a defined operative position at which the intermediate gearing thereon is in meshing engagement with both of said gears;
   (C) interengageable means on said wall and on the carrier rendered effective upon such inward sliding movement of the carrier toward its operative position to define said position and to hold the carrier firmly against its supporting surface without interfering with outward sliding movement of the carrier toward a dismounting position at which said interengageable means are ineffective; and
   (D) releasable latch means for preventing such outward sliding movement of the carrier away from its operative position.

5. The gear train of claim 4, wherein the carrier comprises
   a base;
   bearing means for the intermediate gearing, and adjustable mounting means on the base and connected with the bearing means for securing the bearing means against movement with respect to the base at any selected location thereon.

6. The gear train of claim 5, wherein said adjustable mounting means comprises
   a rail fixed on the base,
   a carriage mounted on and slideable along said rail and across the base,
      the carriage having a track that is perpendicular to said rail and on which the bearing means rides for movement across the base,
   means for securing the carriage to the rail at any location along the length thereof, and
   means for securing the bearing means to the carriage at any position along the track thereon.

References Cited

UNITED STATES PATENTS

| | | | |
|---|---|---|---|
| 2,436,746 | 2/1948 | Drought | 74—325 |
| 3,306,107 | 2/1967 | Freber | 74—325 |

DONLEY J. STOCKING, Primary Examiner

THOMAS C. PERRY, Assistant Examiner